United States Patent
Tybus

[15] 3,677,666

[45] July 18, 1972

[54] CLOSE TOLERANCE PIPE APPARATUS

[72] Inventor: Frank W. Tybus, 9060 Rosecrans Ave., Bellflower, Calif. 90706

[22] Filed: June 25, 1970

[21] Appl. No.: 49,776

[52] U.S. Cl. ............................................417/424, 415/501
[51] Int. Cl. .................F04b 17/00, F04b 35/04, F03b 13/02
[58] Field of Search ...................417/424; 415/501; 285/333, 285/286

[56] References Cited

UNITED STATES PATENTS

| | | | |
|---|---|---|---|
| 214,804 | 4/1879 | Allison .................................. | 285/333 |
| 1,206,706 | 11/1916 | Holmes .............................. | 415/501 X |
| 1,536,754 | 5/1925 | Benson .............................. | 415/501 X |
| 3,406,986 | 10/1968 | Jennings ............................ | 285/286 X |
| 1,577,737 | 3/1926 | Layne et al. ....................... | 417/424 X |

Primary Examiner—Robert M. Walker
Attorney—Fulwider, Patton, Rieber, Lee & Utecht

[57] ABSTRACT

A close tolerance pipe apparatus including a column of pipe lengths formed on their respective opposite extremities with male and female extremities which connect together to form joints. The female extremities are integral with the respective pipe lengths and are expanded to telescope over the respective male extremities. Stop means is secured in the female extremities of the respective pipe lengths and are disposed at a selected distance from the male end of such respective pipe lengths. The male extremities are externally threaded and the female extremities internally threaded whereby the male extremities may be screwed into the female extremities sufficiently far to abut the ends of the male extremities against the respective stop means to thereby provide an overall length for the total pipe column which is the cumulative distance between the stop means and male ends of the respective pipe lengths.

9 Claims, 2 Drawing Figures

Patented July 18, 1972
3,677,666
FIG.1
FIG.2
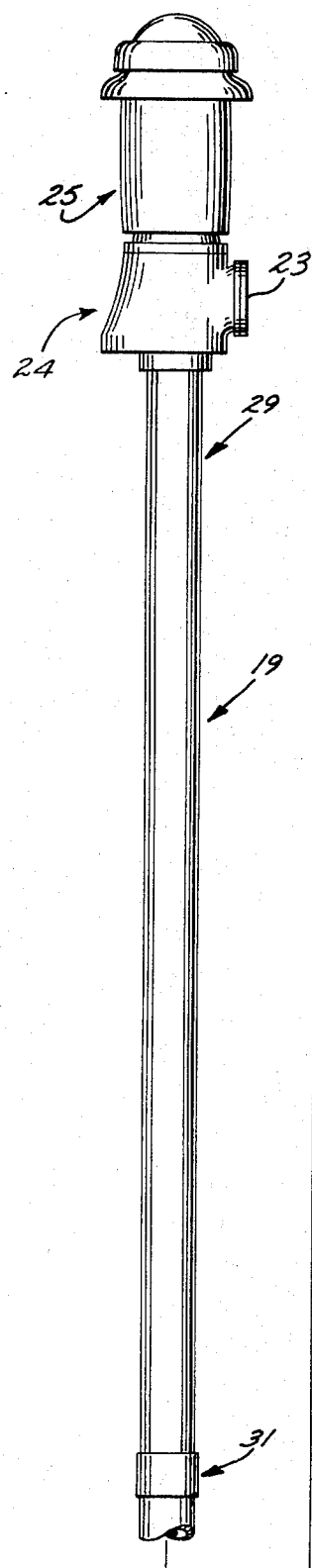
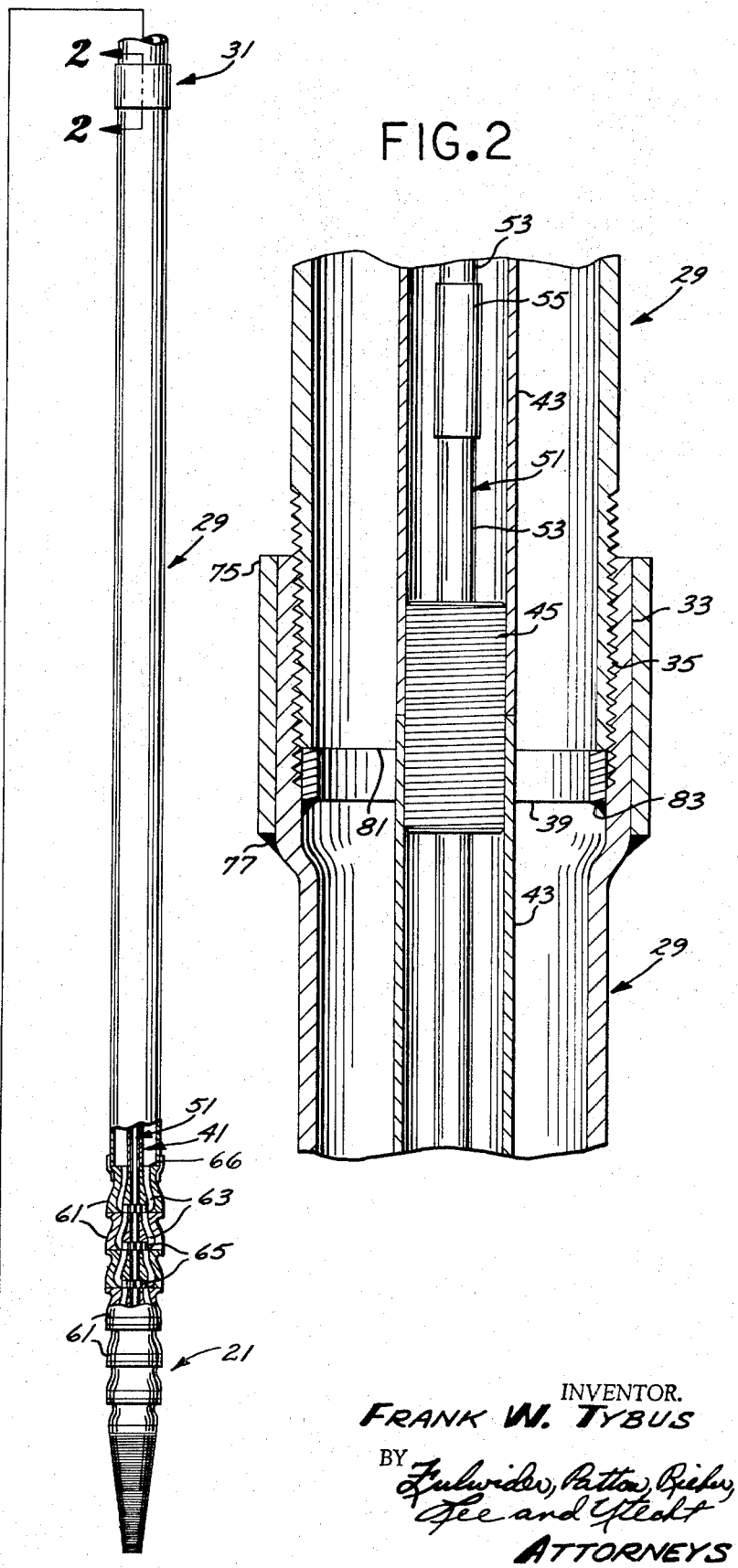
INVENTOR.
FRANK W. TYBUS
BY Fulwider, Patton, Rieber, Lee and Utecht
ATTORNEYS

CLOSE TOLERANCE PIPE APPARATUS

BACKGROUND OF THE INVENTION

1. Field of the Invention

The present invention relates to pipe columns for use in water turbine pumps and the like.

2. Description of the Prior Art:

Water turbine installations normally include a relatively large diameter outer column of pipe leading from a drive motor located above ground to a water turbine disposed at the water source. Tubing generally extends down the center of the pipe column and has an impeller drive shaft telescoped downwardly thereinto for connection on its top end with a drive motor and on its bottom end with the turbine impeller. The column pipe, tubing and impeller shaft are generally made up of many lengths and it is important to hold the overall length of each to close tolerances so they will correspond with one another after installation. It has been common practice to utilize all male pipe in the column and to provide such pipe cut to selected lengths. The pipe lengths are threaded on their opposite ends and internally threaded female couplings are provided for coupling the ends of adjacent lengths together. Column pipe construction of this type suffers the shortcoming of requiring that every length of pipe be threaded on its opposite ends and that, additionally, internally threaded couplings must be provided for each joint.

Numerous pipe joints have been proposed as indicated by the following U.S. Pat. Nos.: 1,287,934, 1,460,769, 2,005,631, 2,259,232, 2,289,271, 2,532,632 and 3,489,437.

SUMMARY OF THE INVENTION

The close tolerance pipe apparatus of present invention is characterized by joints which are formed from integral female portions of pipe lengths which are expanded to telescope over the male portion of connecting pipe lengths. The male and female extremities are threaded and stop rings are secured in the female portions to limit the distance which the male extremities may be screwed thereinto to thereby hold the overall length of the pipe column to relatively close tolerances.

An object of the present invention is to provide a close tolerance pipe apparatus of the type described that is economical to manufacture and easily assembled to provide a desired overall length for the column.

The object and advantages of the present invention will become apparent from a consideration of the following detailed description when taken in conjunction with the accompanying drawing.

DESCRIPTION OF THE DRAWING

FIG. 1 is a broken side elevational view of a close tolerance pipe apparatus embodying the present invention; and FIG. 2 is a vertical sectional view, in enlarged scale, taken along the line 2—2 of FIG. 1.

DESCRIPTION OF THE PREFERRED EMBODIMENT

The close tolerance pipe apparatus of present invention may be conveniently utilized for conducting water from a turbine pump, generally designated 21, located far below ground to a water outlet 23 formed in a head, generally designated 24, located above ground and supporting the housing of a drive motor, generally designated 25. The pipe column 19 includes a plurality of pipe lengths, generally designated 29, which are connected together by joints, generally designated 31. The joints 31 are formed by integral female extremities 33 which are expanded to fit over respective male extremities 35 of connecting pipe lengths 19. Stop rings 39 are secured within the female extremities 33 at selected distances from the opposite, or male, end of the respective pipe lengths whereby the male extremities 35 of the connecting pipe length may be screwed into the respective male extremities 33 sufficiently far to abutt the male end against such stop rings 39 thereby positively holding the overall length of the pipe column to a desired tolerance.

It has been common practice to provide a pipe column which is connected on its upper end with a motor 25 and on its lower end with a water turbine pump 21 and has tubing, generally designated 41, telescoped downwardly therethrough and connected on its upper end with the housing of the motor 25 and on its lower end with the housing of the turbine 21. The tubing 41 includes a plurality of tubing lengths 43 which are internally threaded on their opposite extremities and are connected together by hollow male couplings 45.

An impeller drive shaft, generally designated 51, is telescoped downwardly through the tubing 41 and includes a plurality of shaft lengths 53 which are externally threaded on their opposite ends and are connected together by internally threaded female couplings 55.

The water turbine 21 includes an exterior housing 61 which is made up of a plurality of bowls which form different stage bowl chambers 63 for receipt of impeller wheels 65 connected with the lower extremity of the impeller drive shaft 51. The turbine 21 terminates at its top end in an outlet 66 which is connected with the bottom end of the column 19.

The water turbine 21 is frequently located several hundred feet underground and the individual pipe lengths 29 are 10 or 20 feet long. The tubing 41 and impeller drive shaft 51, of course, are of similar length and may be made up of a similar number of sections. Consequently, it is important that the overall length of the entire pipe column 19 be closely held so it will coincide with the lengths of the tubing 41 and shaft 51 to properly locate the turbine housing 61 and impeller wheels 65 in proper relationship while terminating at their upper extremities at proper spacings for connection with the head 24 and drive shaft of the motor 25.

The respective female extremities 33 are encased in surrounding reinforcing collars 75 which are welded in position by fillet wells 77.

A particularly convenient method of forming the female extremities 33 is by utilizing a constant diameter pipe length of the desired size and telescoping a reinforcing ring 75 over one extremity thereof. The extremity 33 is then expanded to the desired diameter and is internally threaded. The reinforcing collar 75 may then be welded in place by means of the wells 77 to assure that it remains in position.

The male end 81 of the respective lengths are cut perpendicular to the center line of the pipe and the stop rings 39 are placed in position, also perpendicular to the pipe center line and are welded in place by weld fillets 83.

In operation, the selected number of pipe lengths 29 are connected together to form a column 19 reaching from the underground turbine 21 to the motor 25. The number of tubing lengths 43 and impeller shaft lengths 53 are then assembled together to form a tubing 41 and shaft 51 which have overall lengths corresponding with the length of the pipe column 19 to provide for proper positioning of the impeller wheels 65 when the upper end of the shaft 51 is connected with the drive shaft of the motor 25.

When the motor 25 is operated to drive the turbine 21, water will be pumped upwardly within the pipe column 19 thereby creating relatively high hydrostatic pressures therein. Consequently, the joints 31 must withstand relatively high pressures throughout the length of such pipe.

From the foregoing detailed description it will be apparent that the pipe apparatus of present invention provides an economical and convenient means for forming a pipe column made up of a number of lengths of pipe to provide an overall column length held to a relatively close tolerance.

Various modifications and changes may be made with regard to the foregoing detailed description without departing from the spirit of the invention.

I claim:

1. Underground pump apparatus comprising:

pump means adapted to be disposed in an underground pool and including bowl means defining a chamber terminating at one end in a pump outlet, said pump means including impeller means disposed in said chamber;

a drive motor adapted to be disposed above ground;

a drive shaft connecting said drive motor with said impeller means;

an outlet head adapted to be disposed at ground level and disposed a consequent distance above said pump outlet;

a pipe column of said consequent length and including a selected number of pipe lengths formed on their respective opposite ends with male and female extremities which connect together to form joints, said female extremities being formed by integral pipe portions expanded to form female sockets;

stop means secured in said sockets at predetermined distances from the respective male ends of said respective pipe lengths;

internal threads in said sockets;

external threads on said male extremities whereby said pump means may be located in said pool thereby locating said pump outlet said consequent distance from said outlet head, said drive shaft connected between said pump and said drive motor with said selected number of pipe lengths telescoped thereover and assembled by screwing said respective male extremities into the female sockets of the respective adjoining pipe lengths until the male ends of said respective lengths abut the stop means in the sockets of the respective adjoining pipe lengths so the resultant assembled lengths will form a known overall length to enable said pipe column of said predetermined distance to be easily formed.

2. Underground pipe apparatus as set forth in claim 1 wherein:

said pipe column includes at least five said pipe lengths.

3. Underground pipe apparatus as set forth in claim 1 wherein:

said pipe column is at least 100 feet in length.

4. Close tolerance pipe apparatus as set forth in claim 1 wherein:

said stop means are in the form of rings disposed perpendicular to the center lines of the respective pipe lengths.

5. Close tolerance pipe apparatus as set forth in claim 4 that includes:

reinforcing collars surrounding the respective female extremities.

6. Close tolerance pipe apparatus as set forth in claim 4 wherein:

said internal and external thread means are in the form of straight threads.

7. Close tolerance pipe apparatus as set forth in claim 1 that includes:

reinforcing collars surrounding the respective female extremities.

8. Close tolerance pipe apparatus as set forth in claim 1 wherein:

said internal and external thread means are in the form of straight threads.

9. Close tolerance pipe apparatus as set forth in claim 1 wherein:

said pipe lengths have a cross section greater than 5 inches.

* * * * *